United States Patent
Keszler

[15] 3,663,233
[45] May 16, 1972

[54] METHOD OF TENDERIZING, CURING AND COOKING A MEAT PRODUCT

[72] Inventor: Julius L. Keszler, Boston Post Road, Westbrook, Conn. 06498

[22] Filed: Sept. 28, 1970

[21] Appl. No.: 76,172

Related U.S. Application Data

[63] Continuation-in-part of Ser. No. 725,326, Apr. 30, 1968, abandoned, which is a continuation-in-part of Ser. No. 640,594, May 23, 1967, abandoned.

[52] U.S. Cl. ................................. 99/107, 99/159, 99/187
[51] Int. Cl. ............................... A22c 18/00, A23b 1/00
[58] Field of Search ........................... 99/107, 159, 187

[56] References Cited

UNITED STATES PATENTS

| | | |
|---|---|---|
| 2,224,399 | 12/1940 | Komarik .................................. 99/187 |
| 3,296,953 | 1/1967 | Bjorn-Henriksen et al. .......... 99/159 X |
| 3,370,960 | 2/1968 | Jaccard .................................. 99/107 |
| 3,565,639 | 2/1971 | Schack et al. ........................ 99/159 |

*Primary Examiner*—Hyman Lord
*Attorney*—Delio and Montgomery

[57] ABSTRACT

This invention relates to a process of tenderizing and cooking meat products. A piece of meat is formed to impart thereto a permanent set. The shaped meat has injected or inserted therein a liquid agent and is placed in a close fitting container which is then closed. The container and the meat therein is preheated at a low temperature less than that required for cooking to allow the agent to permeate all through the meat and produce accelerated tenderizing thereof. Subsequently the meat is fully cooked at a higher temperature with minimum weight loss.

4 Claims, 9 Drawing Figures

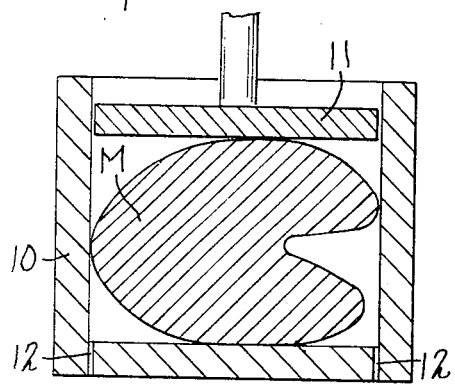
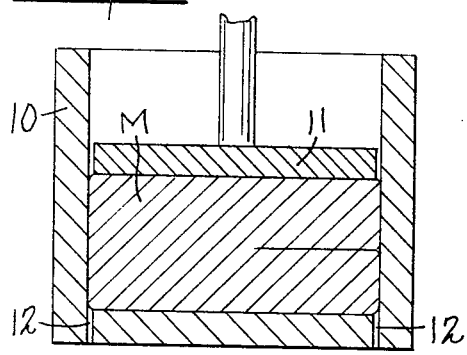
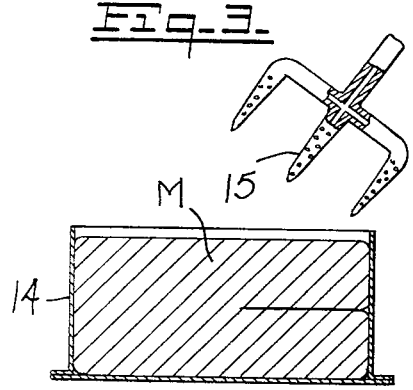
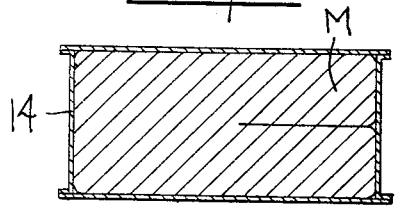
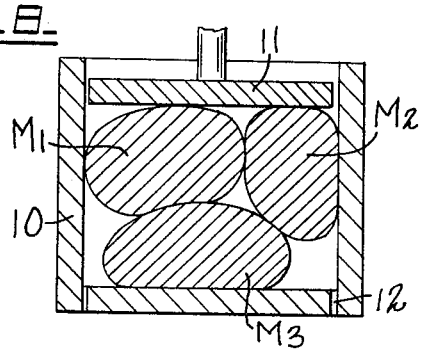
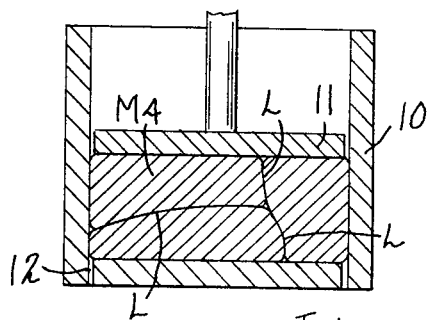

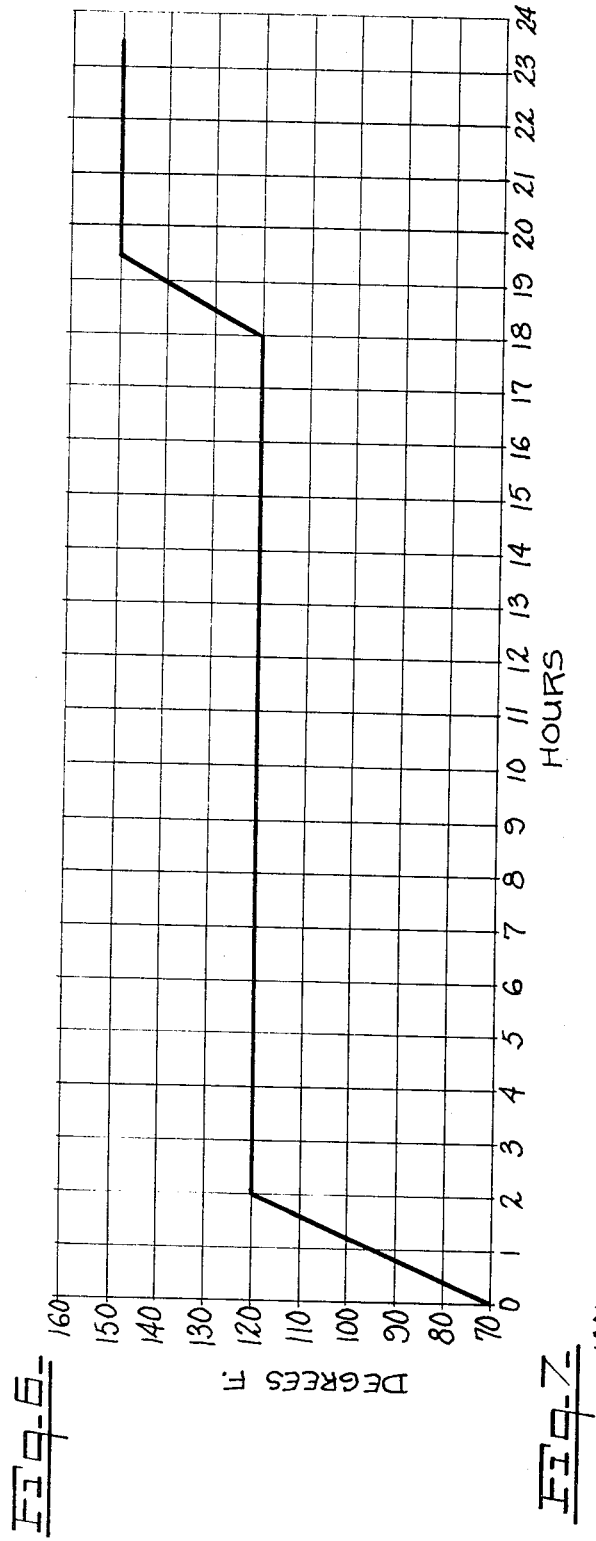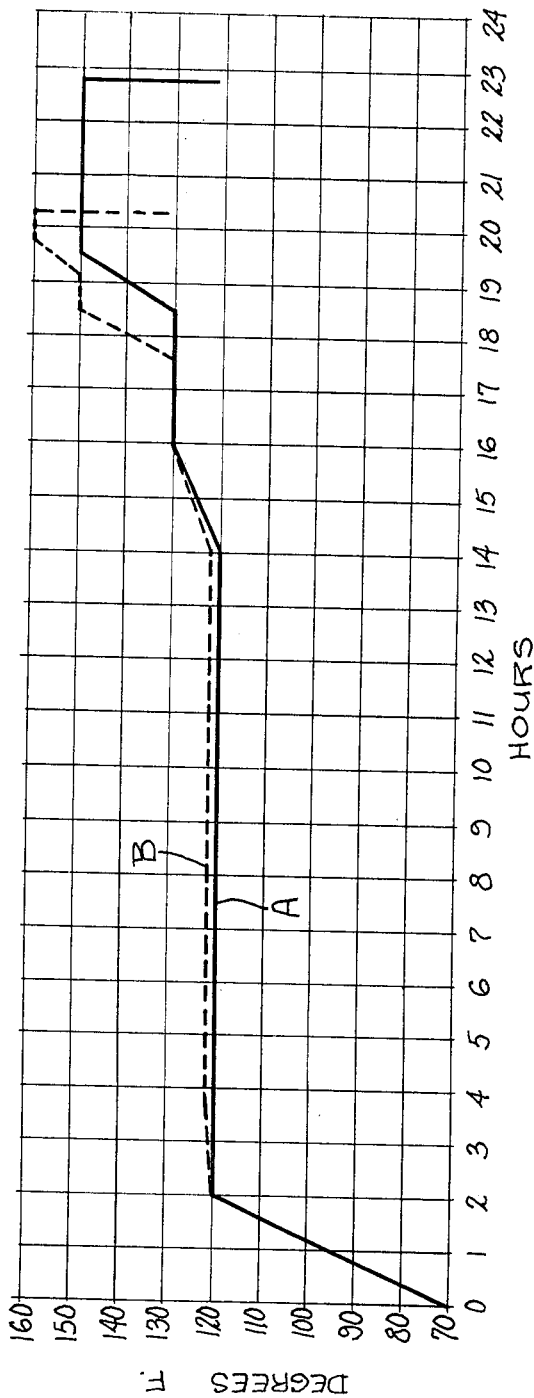

METHOD OF TENDERIZING, CURING AND COOKING A MEAT PRODUCT

This application is a continuation-in-part of my copending application Ser. No. 725,326 filed Apr. 30, 1968 which is a continuation-in-part of application Ser. No. 640,594, filed May 23, 1967 both now abandoned.

This invention relates to food products, and more particularly relates to meat products and methods of tenderizing and processing the same.

This invention provides a continuous process for tenderizing and fully cooking a meat product, primarily beef, which comprises a piece of meat formed into a predetermined cross-section or shape so it may efficiently be packaged and/or conveniently presented for sale.

Heretofore, beef products which have been prepared for canning or sale in loaf form or other predetermined shape have comprised a plurality of chunks of beef which are held together by a gelatinous substance to achieve a predetermined shape and cross-section. These products have been formed by cooking individual chunks together with a gelatinous substance to bond the individual chunks together. Also, pieces of beef had previously been shaped into predetermined contours by rolling and tying, or by actually trimming and cutting the meat to a predetermined shape. This last-mentioned technique results in a great deal of waste, and a resulting expensive product which has not been suitable for sale in canned form. Additionally, where such pieces of beef are aged to achieve a good degree of tenderness such aging or ripening usually requires a period of 12 to 14 days or more in an environment of 36° F. The process of aging is, in essence, a tenderizing process which depends on bacterial deterioration of the fibers of the meat.

In the case of corned beef, the curing or corning of the beef has required soaking of the beef in a corning solution in a given temperature range for as much as 2 weeks. The resulting beef is then packaged for sale to the customer who ultimately cooks it.

In curing hams it has been the practice to inject a curing and aging solution in arteries of the raw ham and place the ham in a curing solution for 5 to 6 days at a low temperature. When the ham is ultimately cooked there is a substantial weight loss.

The curing of hams is a well-known art, and many techniques of curing are known. The curing of fresh pork into ham, however, is a time-consuming process which is designed to add a particular flavor to the pork. Since pork is an inherently tender meat, no tenderizing is required. Various cures may include smoking, treatment with brine, heavy salt, etc., and also sugar to produce various flavors and types of hams. Many hams are advertised by names such as Country, Smithfield, Sugar Cured, etc., dependent on the mode of curing.

However, these various cures for ham are designed to enhance the taste of an initially relatively tender and bland meat — pork. Such cures do not produce a tenderizing process.

It has been proposed that raw hams may be cured by soaking in a curing solution with or without previously pumping at an elevated temperature above a so-called putrefication zone. This proposed curing method requires for any volume of production, extremely large, corrosion proof vats containing curing solution that must be elevated in temperature, and further requires that the new curing solution be changed after each batch. Additionally, in this method of curing, there is no control over the amount of liquid or salt absorbed by the pieces of meat. Where a ham is soaked in a curing or pickling solution, the surface layers will collect much salt resulting in a non-uniform cure. If the temperature is not kept within certain predetermined limits, undesired cooking of the ham may occur.

After hams are cured, if not sold in their original shape, they require thorough washing, boning, fat trimming and draining to be suitably conditioned for canning or packaging and subsequent cooking. A prevalent cooking procedure is to form the trimmed ham into a predetermined shape to fit a cooking container or can. This may be done with relatively little pressure since the fibers of pork are relatively weak. The resultant product may be displayed as a loaf, or sliced and packaged, or sold in the can in which it is cooked.

In the case of meat subjected to known curing or tenderizing processes, the present practices are time consuming and require substantial space for storage. This results in high monetary investments for meat equipment and storage space. An extremely important consideration in processing meat is weight loss. Fresh meat is bought by weight and the processed meat sold by weight at prices dictated by competitive conditions. Accordingly, weight loss in processing as well as time of processing are extremely important considerations to the meat processor.

The present invention is primarily directed to the tenderizing and preparation of a cooked beef product in a continuous process to provide a tender, fully cooked product with minimum weight loss from relatively low grade beef (not U.S. Choice or prime).

Beef products are substantially different from pork in that the meat is more fibrous and of stronger fiber with much stronger connective tissue. With the exception of certain select cuts from high grade animals, it is not sufficiently tender to cook as by broiling or oven roasting, but must be cooked with liquid as in pot roasts, stews, etc., or marinated over a period of time prior to cooking.

The present invention, accordingly, provides a new and improved method of tenderizing and fully cooking a piece of beef in a unitary form or shape in minimum time with minimum weight loss. However, the process is also useful in the preparation of hams to yield a more tender cured and fully cooked cured ham with minimum weight loss in minimum time in a continuous process.

Briefly stated, in practicing the invention in one form thereof, a piece of beef is placed into a mold and subjected to sufficient pressure to shape it to the configuration of the mold and at least partially disrupt or rupture the fibers and connecting tissues without pulping. The beef is then pumped with a liquid agent and placed within a close fitting container which is closed. The container, or a multiplicity thereof, is then raised to a substantially constant temperature which is below cooking temperature and maintained at such temperature for a period of time. The liquid agent will permeate throughout the meat and uniformly tenderize it. The heating medium is then raised to a temperature slightly above the final internal temperature of the meat and maintained at such temperature until it is fully cooked. The process may provide a very tender and fully cooked beef product within 24 hours, starting with green low grade beef. By suitable selection of the constituents of the liquid agent, various flavors may be imparted to the finished product.

An object of this invention is to provide a new and improved method of preparing a meat product for sale in a fully cooked condition.

Another object of this invention is to provide a new and improved method of tenderizing and/or curing a meat product.

Another object of this invention is to provide a new and improved method of rapidly tenderizing and cooking a piece of beef.

A further object of this invention is to provide a new and improved process for curing and fully cooking a ham in a continuous process.

The features of the invention which are believed to be novel are set forth with particularity and distinctly claimed in the concluding portion of this specification. However, the invention, both as to its organization and operation, may best be appreciated by reference to the following detailed description taken in conjunction with the drawings, in which:

FIG. 1 is a view in cross-section of an apparatus for forming a unitary piece of meat into a predetermined shape;

FIG. 2 is a view similar to FIG. 1 but further illustrating the meat product being formed;

FIG. 3 is a cross-sectional view of the formed meat product in a container prior to sealing;

FIG. 4 is a cross-sectional view of the formed meat product in the container upon sealing;

FIG. 5 is a flow diagram of overall processes of preparing a beef product in accordance with the invention;

FIG. 6 is a graphic time-temperature representation of one embodiment of the invention;

FIG. 7 is a graphic time temperature representation of another embodiment of the invention;

FIG. 8 is a view in cross-section similar to FIG. 1 of an apparatus for forming a plurality of pieces of meat into a predetermined shape; and FIG. 9 is a view similar to FIG. 6 but further illustrating the meat product being formed.

In practicing the invention in one form thereof, a piece of beef M, such as the top round, bottom round, or the sirloin tip which may be classified only as U.S. Good or may be imported knuckles or joints of relatively stringy structure, such as from Australia or New Zealand, is placed in a rigid mold 10 which may be of generally rectangular configuration both in plane and cross-section and which is adapted to receive therein a plunger or piston 11 of a hydraulic press. In one embodiment of the invention, a mold has been made of heavy gauge steel plate of welded construction having an interior length of 12 inches and an interior width of 6 inches. If desired the mold may be made to impart shapes other than rectangular. In any event, the dimensions of the shaped meat should be essentially the same as the container in which it will be processed. Apertures 12 may be defined in the bottom of the mold to allow exit of any blood or juices which may be squeezed from the piece of beef M. In practice, it has been found however that only a minimal amount of liquid is lost due to compression. The piece of beef M is formed preferably at a temperature of 35° to 40° F. having been taken from a cooler or elevated just above a frozen temperature. The plunger 11 is moved downwardly under sufficient pressure of about 300 to 700 pounds per square inch to engage the piece along one dimension or surface thereof and to compress the piece of beef M within mold 10 and shape it to the interior thereof. Preferably the beef is formed into approximately a 4 × 6 inches cross-section. This pressure is sufficient to at least partially rupture, disrupt or deform the fibers or tissues within the piece of beef to cause the beef to take a permanent set without pulping or otherwise destroying the texture of the beef. This imparts to the piece of beef M a permanent set in the shape of the mold cavity. Also, this deformation or rupturing of the fibers serves to tenderize the beef, and permit further tenderizing as hereinafter described. The formed beef which is in the shape of a long loaf of rectangular cross-section, is then removed from mold 10. The formed beef M is cut to a desired length which will give it substantially its ultimate sale weight; for example, it may be cut into 2, 3 or 4 pound lengths and inserted into a close fitting container which may be corresponding size cans as indicated in the process column in the right side of FIG. 5. Then a liquid curing agent, which may be primarily a salt base or brine solution, is injected at several points into the formed meat M as by use of a conventional injecting fork 15 to provide substantial uniform injection of the meat. Fork 15 is hollow with a plurality of apertures therein, and is connected to a source of the liquid agent (not shown). This step may be carried out by a platen or manifold having a plurality of needles in liquid communication therewith, and is commonly known as "pumping."

Where the meat is to be ultimately sold in visible form, after forming and pumping, the piece of meat is removed from the mold and is placed in a plastic bag, such as polyethylene, which is drawn tightly about the formed piece, and then placed in a cooking form or container with a close fit and the container is then closed. This alternate process is exemplified in the process column in the left side of FIG. 5. This insures that the liquid agent will not be lost to a surrounding environment during the remainder of the process.

A multiplicity of the cans or containers are then placed in a medium such as a vat of water raised to a substantially constant temperature of about 117° – 125° F. The closed containers insure that there will be no circulation of the heating liquid about the meat, and further that there will be no loss of the pumping fluid to the heating environment. The temperature of the liquid in practice is maintained at 120° – 125° F. to comply with Federal Regulations.

The meat is then left in the heating liquid until the center of the meat reaches a temperature of 117° – 125° F. and then maintained at such temperature for at least 9-to-10 hours, and preferably 12 hours. Where the meat is initially at a temperature of 35° – 40° F. a period of 6 hours may be required for the center of a 4 × 6 inches piece to reach the specified range.

If the meat is to be sold in a can, it is initially placed in a close fitting can either before or after pumping as shown in FIG. 3 and the interior of the can is sprinkled with a gelatin powder to absorb any released liquid. Then the can is sealed as shown in FIG. 4.

During this tenderizing or precooking step, the temperature of the meat is in a range which inhibits growth of bacteria. Additionally, the injected liquid agent permeates entirely through the ruptured or disrupted tissues and fibers of the beef to produce a uniform tenderizing effect throughout. It is believed that this elevated substantially constant temperature produces an environment favorable to enzyme action which further weakens the connective tissues between the fibers of the meat and further enhances the tenderizing process.

It is important that during the tenderizing process, the meat not be subjected to a temperature which would commence cooking of the beef since this would decelerate and eventually halt the tenderizing process. I have found that "cooking," that is, the coagulation of the protein in the beef, commences at approximately 126° F. and accelerates as the temperature is thereafter raised.

The tenderizing is believed to be due to both the disruption of the fibers and connecting tissues and the permeation of the liquid agent all through the meat and weakened fibers and tissues at the elevated constant temperature which is insufficient to commence cooking of the meat. Maintaining the temperature constant during the tenderizing process further helps insure uniform tenderizing of the meat.

The tenderizing process produces no substantial weight loss since no cooking is taking place. Inspections have shown very little, if any, liquid in the plastic bags at the completion of the tenderizing process.

After tenderizing, the water in the cooking vat is raised to a temperature in the range of 150° – 165° F. and held at a constant temperature in this range to bring the center of the meat to at least 148° F. Where the meat is in a loaf of 4 × 6 inches, this will require 2-to-4 hours at the elevated temperature. While the meat may be considered by some to be fully cooked at a temperature less than 148° F. most food and health authorities, including the U.S. Government, require a minimum internal temperature of at least 148° F.

I prefer to bring the meat to the minimum allowable internal temperature to keep weight loss to a minimum. This is done in no less than 2 hours. To enhance reduction of weight loss, the cooking liquid is maintained at substantially uniform or constant temperatures both during the tenderizing and the cooking steps.

Where a large number of pieces of beef are to be processed at one time, I prefer to insert an intermediate step between tenderizing and cooking. This is done to insure that a few random pieces of the meat will not exhibit uncooked or green spots where large batches are processed on a commercial scale.

Accordingly, after tenderizing, the heating liquid is raised at a controlled rate to a constant temperature between 128° F. and 132° F. This produces what may be termed a low grade cooking effect and causes some protein coagulation while further contributing to tenderization. This may be done for 2-to-4 hours dependent on the overall cooking cycle. This also decreases the weight loss of the product since the temperatures to which the meat is subjected to are changed less abruptly. It is believed that meat which has a high natural liquid content loses liquid more rapidly when subjected to large temperature changes over a short period of time.

Tests have shown that the specified tenderizing range of the piece of beef may be reached in 5-to-6 hours without exceeding the lower limits of cooking temperatures by the heating medium.

A piece of beef of approximately ten pounds was prepared as described, placed in a plastic bag and inserted into a 4 × 6 × 12 inches cooking container and immersed with the internal temperature of the beef at approximately 40°. As shown in Table I below, where the cooking water temperature was maintained at 120° F. the internal temperature of the meat reached the specified range in about 5½ hours. Thereafter, the temperature of the cooking water was raised to 150° over a 2-hour period and maintained at 150° for a period of 4 hours until the internal temperature of the beef reached 148° – 150° F.

TABLE I

| Temperature | Time | |
|---|---|---|
| Approximately 40° F. | Start | |
| 50° F. | 1 | Hour |
| 70° F. | 1½ | Hour |
| 75° F. | 2 | Hour |
| 80° F. | 2½ | Hour |
| 82° F. | 3 | Hour |
| 92° F. | 3½ | Hour |
| 104° F. | 4½ | Hour |
| 118° F. | 5½ | Hour |
| 120° F. | 6 | Hour |

The internal temperature of the meat reached the tenderizing zone at approximately 5½ hours. After 6 hours there was no temperature gradient across the meat. After approximately 10 hours in this condition, the meat may then be subjected to the cooking temperature to fully cook the meat.

This process is exemplified in FIG. 6 which shows a time-temperature relationship of the cooking liquid during the overall continuous process.

FIG. 7 exemplifies the time temperature relation when the aforementioned intermediate step is utilized. The cooking liquid is brought up to temperature of 120° F. in 2 hours and held there for 12 hours.

The temperature of the meat reaches the specified tenderizing range in about 5½ hours, and is held there for approximately 8½ hours. At this time the temperature of the cooking liquid is raised to 130° F. over a 2-hour period (Curve A). Actual cooking of the meat (protein coagulation) will commence when the meat or various portions thereof reach a temperature of about 126° F. which would occur at about 15 to 16 hours. Thereafter, the meat is subjected to a low grade cooking temperature and ultimately subjected to a higher cooking temperature to produce a minimum internal temperature of 148° – 150° F. at which time the cycle is completed.

This process was applied to a number of pieces of top rounds imported frozen from Australia. This meat is rather stringy and tough with little fat content. A total trimmed weight of 2,673 pounds comprising approximately 260 – 280 pieces were subjected to pressure to disrupt the fibers and pumped with a liquid agent to a 17 percent increase in weight. The pieces were then placed in close fitting plastic bags and placed in 4 × 6-¼ × 12 inches cooking forms which were closed. The containers were then subjected to the temperature shown in Curve A, FIG. 7, in a temperature controlled cooking vat using water as the cooking liquid. Upon completion, the pieces of beef were cooled to approximately 90° F., some cut into lesser size for sale and hermetically sealed in transparent wrap. The final weight was 2,425 pounds. There was a cooking weight loss of only 9.27 percent. The final product was of uniform texture and color throughout, extremely tender, and very appetizing in taste.

A further test was made on lots of Australian sirloin tips of approximately 1,400 pounds each. These pieces were prepared as previously described. One lot was treated as shown in Curve A, FIG. 7, to fully cook at a final ambient temperature of 150° F. and the second was treated as shown by Curve B, to fully cook to 150° F. internal at a final ambient temperature of 160° F. The overall cycle was approximately 3 hours less, but a 0.4 percent greater weight loss was experienced. This weight loss is more significant when it is considered that the lot of Curve A was pumped to 16.1 percent increased weight and the lot of Curve B was pumped to 25 percent increased weight.

Accordingly, I prefer to complete the cooking cycle at as low a final temperature as possible on the order of 148°–152° F. to minimize the temperature gradient across the meat and to maintain the temperature through the meat as uniform as possible, and to minimize changes in the temperature of the cooking liquid.

The liquid curing agent used is of conventional constituents of water, salt, sugar, and small amounts of sodium nitrate and nitrite. Additionally, various flavoring such as spices may be added for a corned or spiced flavor in strengths dependent on the strength of flavor desired. Generally, the salt will be about 8 percent or less by weight in the liquid agent. Some salt content is desired to aid in inhibiting bacteria growth prior to final cooking.

The invention may further be practiced without the liquid agent also functioning to effect a cure or partial cure of the product. In this instance, only an agent such as water without any salt content, is utilized. The pumped beef in a sealed container may be subjected to uniform heat for the same period of time in a temperature range of 118° – 125° F. in either a sealed can or a sealed plastic bag. The beef is then fully cooked as described. When the beef is processed without any curing action, it should be refrigerated and used within 2 to 3 weeks or should be frozen to be preserved.

The invention is further applicable to shaping a plurality of pieces of meat into a unitary loaf. As illustrated in FIG. 8, a plurality of pieces of beef $M_1$, $M_2$ and $M_3$ may be compressed into a loaf $M_4$, as shown in FIG. 9, under sufficient pressure to rupture, disrupt or deform the fibers or tissues of the beef to cause the beef to take a permanent set without pulping or otherwise destroying the texture. A small amount of powdered gelatin is sprinkled on the pieces of beef either before or after shaping. The formed piece of beef $M_4$ may then be treated as the unitary formed piece of beef shown in FIG. 2. It has been found that the gelatin powders will travel into the areas of contact L along which the different sections $M_1$, $M_2$, and $M_3$ are in contact during the cooking process and will then set up. When the gelatin powder absorbs any moisture and sets, it will act to insure a bond between all the sections $M_1$, $M_2$ and $M_3$ and the result will be a unitary loaf of beef without the appearance of various sections being bonded together. Only the different directions of the grain of the initially separate pieces will evidence the bond.

It has further been determined that the individual pieces may be bonded together and the resultant loaf appear as an integral piece of beef by injecting with the liquid agent very finely divided pieces of beef which gives the agent a thicker consistency. During the precooking step, the curing agent together with the finely divided beef travels into the surfaces L and effects a bond therebetween.

The invention is further applicable to the curing of hams and the process is substantially the same as that previously described. Ham, or pork, however is a relatively tender meat and little pressure is required for forming a deboned ham. If pressure was applied to attempt to disrupt the fibers or connective tissues, pulping and loss of natural fluids would result and the ham becomes unfit for sale. In forming ham, which has substantially less strong tissues and fibers than beef, only sufficient pressure is applied to shape the ham into the desired shape. The pressure is insufficient to disrupt or deform, or possibly pulp, the fibers or tissues of the ham. The fresh ham is trimmed and deboned and then formed under pressure and placed in the conventional cooking container. The fresh ham may be pumped either prior to being formed or subsequent to being formed. Since a definite curing or pickling process is required, a conventional pumping liquid with a relatively high salt content is used.

It is preferred that after the ham has been pumped, it is then completely frozen. It has been found that freezing of the ham before the precooking step results in less weight loss of the ham during cooking thereof. It is believed that the freezing step tends to bind the water in the meat together with the solution injected therein. The freezing of the ham with the liquid curing agent therein further acts to tenderize the ham.

Subsequent to freezing, which is preferably done by a blast freezer, to bring the temperature of the ham to approximately −5° to insure freezing of the brine, the ham is placed in a cooking container and sealed as shown in FIG. 4 and then is subjected to the precooking step for 14 to 18 hours at preferably 118° − 125° F. with the interior of the ham being within this range for at least about 9 hours. Subsequently, the ham is subjected to a final cooking temperature of 148° − 165° for at least 2 hours and up to 4 or 5 hours dependent upon the cross-sectional dimensions of the ham.

If the ham is subjected to the freezing step, the precooking step may be lengthened by 1 to 2 hours. If desired, the ham may be subjected to the precooking and cooking steps while in a sealed plastic container as previously described for beef.

By way of example only, a fresh 10-pound ham was deboned and trimmed, injected with 2 pounds of brine solution, formed into a loaf shape, frozen with the brine therein, subsequently precooked and cured at 122° − 123° F. for a period of 17 hours in a closed container, and then cooked at a temperature of 138° F. for a period of 5 hours. The resulting product was fully cured and cooked and had a weight of 10 pounds, 8 ounces, the usual cooked ham appearance and color, and was extremely tender and appetizing in taste. If fully cooked to a minimum temperature of 148° F. there would have been a greater weight loss and less time in the final cooking step.

It has been determined that with either ham or beef the weight loss experienced in the disclosed processes is substantially less than with other cooking processes. This is believed to be due in part to the initial tenderizing step in which the liquid permeates all through the meat and is absorbed by the beef. Additionally, the precooking and cooking steps of the meat in the sealed container, whether it be a can or plastic bag, and in preventing loss of liquid in the meat to the ambient atmosphere. It is a well-known fact that meat has a very large liquid constituent. For example, the liquid content may be 90 percent of the weight of the meat (exclusive of bone) of raw ham. Through practice of the invention in a manner as described, the meat is prepared with minimal liquid loss, and a very tender and fully cooked meat product is obtained.

It will be appreciated that my process has differences in application as applied to beef and ham. In processing the beef the precooking step is necessary for the purpose of tenderizing particularly low grade pieces of beef. The addition of different flavors is subsidiary. Pork is inherently a tender meat and does not generally require any tenderizing. Therefore, my process as applied to ham, while acting to tenderize, also provides accelerated curing and complete cooking of the ham from fresh pork on one continuous process, of relatively short duration (less than 24 hours).

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiment may occur to those skilled in the art. Accordingly, the appended claims are intended to cover all embodiments of the invention which do not depart from the spirit and scope thereof.

What is claimed is:

1. A process of tenderizing, curing and cooking a meat product in a continuous process which comprises the steps of injecting a piece of meat with a liquid curing agent and subjecting the piece to pressure in a form of predetermined shape to at least partially disrupt the tissues of the meat without pulping the meat, the pressure applied being sufficient to shape the piece to the shape of the form when the pressure is released; placing the shaped piece in a close fitting container and closing the container; subjecting the container to heat at a temperature insufficient to commence cooking of the piece, but sufficient to bring the internal temperature of the piece to approximately 117°–125° F., and maintaining the internal temperature in said range at least for about 9 hours to allow the liquid curing agent to permeate through the meat to uniformly tenderize and cure said meat; and then subjecting the container to a temperature range of approximately 148° F.–165 F. for at least 2 hours until said piece of meat is fully cooked.

2. The process of claim 1 wherein the meat is beef and a plurality of pieces of beef are simultaneously compressed in said form.

3. The process of claim 1 wherein after the temperature is maintained at 117°–125° F., the heat to which the container is subjected is slowly raised to a temperature range of 128°–132° F. and maintained thereat for a period of 2 to 4 hours, and thereafter subjected to a temperature sufficient to bring the internal temperature to at least 148° F. in no less than 2 hours.

4. A process of tenderizing, curing and cooking a beef product which comprises the steps of confining at least one piece of beef in a mold, applying sufficient pressure along one dimension of said beef so as to shape it to the mold and impart a set in the form of the mold thereto when the pressure is released, the applied pressure being sufficient to at least partially disrupt the tissues of the beef but insufficient to cause pulping thereof, injecting a liquid curing agent into the shaped beef, placing the shaped beef in a container subjecting said container to uniform heat in a temperature range which is insufficient to cook the piece of beef therein but sufficient to bring the internal temperature of the beef to approximately 117°–125° F., and maintaining the internal temperature in said range for at least 9 hours or more to allow the liquid to permeate through the piece to uniformly tenderize and cure the piece of beef, and then subjecting the container to uniform meat at a higher temperature to bring the internal temperature of said piece of beef to at least 148° F. in no less than 2 hours.

* * * * *